United States Patent
Park

(10) Patent No.: US 9,053,635 B2
(45) Date of Patent: Jun. 9, 2015

(54) CRUISE CONTROL APPARATUS AND CONTROL METHOD THEREOF

(75) Inventor: Byung Suk Park, Gyeonggi-do (KR)

(73) Assignee: MANDO CORPORATION, Pyeongtaek-Si, Gyeonggi-Do (KR)

(*) Notice: Subject to any disclaimer, the term of this patent is extended or adjusted under 35 U.S.C. 154(b) by 155 days.

(21) Appl. No.: 13/492,489

(22) Filed: Jun. 8, 2012

(65) Prior Publication Data

US 2012/0316746 A1 Dec. 13, 2012

(30) Foreign Application Priority Data

Jun. 8, 2011 (KR) .................. 10-2011-0054859

(51) Int. Cl.
| | |
|---|---|
| G08G 1/052 | (2006.01) |
| B60W 10/06 | (2006.01) |
| B60W 10/184 | (2012.01) |
| B60W 30/14 | (2006.01) |
| G08G 1/0962 | (2006.01) |

(52) U.S. Cl.
CPC .............. *G08G 1/052* (2013.01); *B60W 10/06* (2013.01); *B60W 10/184* (2013.01); *B60W 30/143* (2013.01); *G08G 1/09626* (2013.01); *B60W 2520/28* (2013.01); *B60W 2550/146* (2013.01); *B60W 2550/147* (2013.01); *B60W 2550/22* (2013.01); *B60W 2550/402* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,105,703 | A * | 8/2000 | Kuroda et al. | 180/248 |
| 6,999,859 | B2 * | 2/2006 | Kin | 701/1 |
| 7,266,438 | B2 * | 9/2007 | Kellum et al. | 701/93 |
| 7,774,121 | B2 * | 8/2010 | Lee et al. | 701/70 |
| 7,792,624 | B2 * | 9/2010 | Nakamura et al. | 701/72 |
| 8,306,672 | B2 * | 11/2012 | Nickolaou | 701/1 |
| 8,451,140 | B2 * | 5/2013 | Piccinini et al. | 340/905 |

(Continued)

FOREIGN PATENT DOCUMENTS

| | | |
|---|---|---|
| DE | 10 2007 005 245 A1 | 11/2007 |
| WO | 2010/144030 A1 | 12/2010 |
| WO | WO 2010144030 A1 * | 12/2010 ............ B60W 10/10 |

OTHER PUBLICATIONS

German Office Action issued in German Patent Application No. DE 10 2012 010 865.6 dated Sep. 16, 2013.

(Continued)

*Primary Examiner* — Jonathan L Sample
(74) *Attorney, Agent, or Firm* — McDermott Will & Emery LLP

(57) ABSTRACT

Disclosed is a cruise control method including traveling a vehicle at a speed input by a driver, receiving road information from a navigation device, confirming whether or not deceleration information is present in the road information, confirming a speed corresponding to the deceleration information if the deceleration information is present, and controlling a speed of the vehicle to the confirmed speed if the confirmed speed is greater than the input speed. If the vehicle speed exceeds the speed limit of a road, the vehicle speed is automatically reduced to below the speed limit, and a warning operation is performed. Thereby, probability of accidents due to speeding may be reduced, and it may be possible to make the driver obey the Road Traffic Act and to prevent imposition of fines due to speeding. Further, the vehicle speed is automatically reduced at bumps or curves, resulting in enhanced safety and driver convenience.

14 Claims, 4 Drawing Sheets

(56) References Cited

U.S. PATENT DOCUMENTS

| | | | |
|---|---|---|---|
| 8,521,468 B2* | 8/2013 | Tan | 702/148 |
| 8,686,845 B2* | 4/2014 | Pilutti et al. | 340/441 |
| 2004/0068359 A1* | 4/2004 | Neiss et al. | 701/96 |
| 2004/0093128 A1* | 5/2004 | Kin | 701/1 |
| 2007/0106442 A1* | 5/2007 | Lu | 701/38 |
| 2008/0015743 A1* | 1/2008 | Haug | 701/1 |
| 2008/0015764 A1* | 1/2008 | Watanabe | 701/72 |
| 2009/0005945 A1* | 1/2009 | Takeda et al. | 701/70 |
| 2009/0037062 A1* | 2/2009 | Lee et al. | 701/70 |
| 2010/0082215 A1* | 4/2010 | Miyajima et al. | 701/93 |
| 2010/0082216 A1* | 4/2010 | Yasui et al. | 701/93 |
| 2010/0138123 A1* | 6/2010 | Tokimasa et al. | 701/70 |
| 2010/0157061 A1* | 6/2010 | Katsman et al. | 348/149 |
| 2010/0209889 A1* | 8/2010 | Huang et al. | 434/65 |
| 2010/0324796 A1* | 12/2010 | Takeuchi et al. | 701/70 |
| 2011/0060478 A1* | 3/2011 | Nickolaou | 701/1 |
| 2011/0102166 A1* | 5/2011 | Filev et al. | 340/435 |
| 2012/0053853 A1* | 3/2012 | Tan | 702/35 |

OTHER PUBLICATIONS

Chinese Office Action issued in Chinese Application No. 201210187003.1 dated Jul. 23, 2014.

* cited by examiner

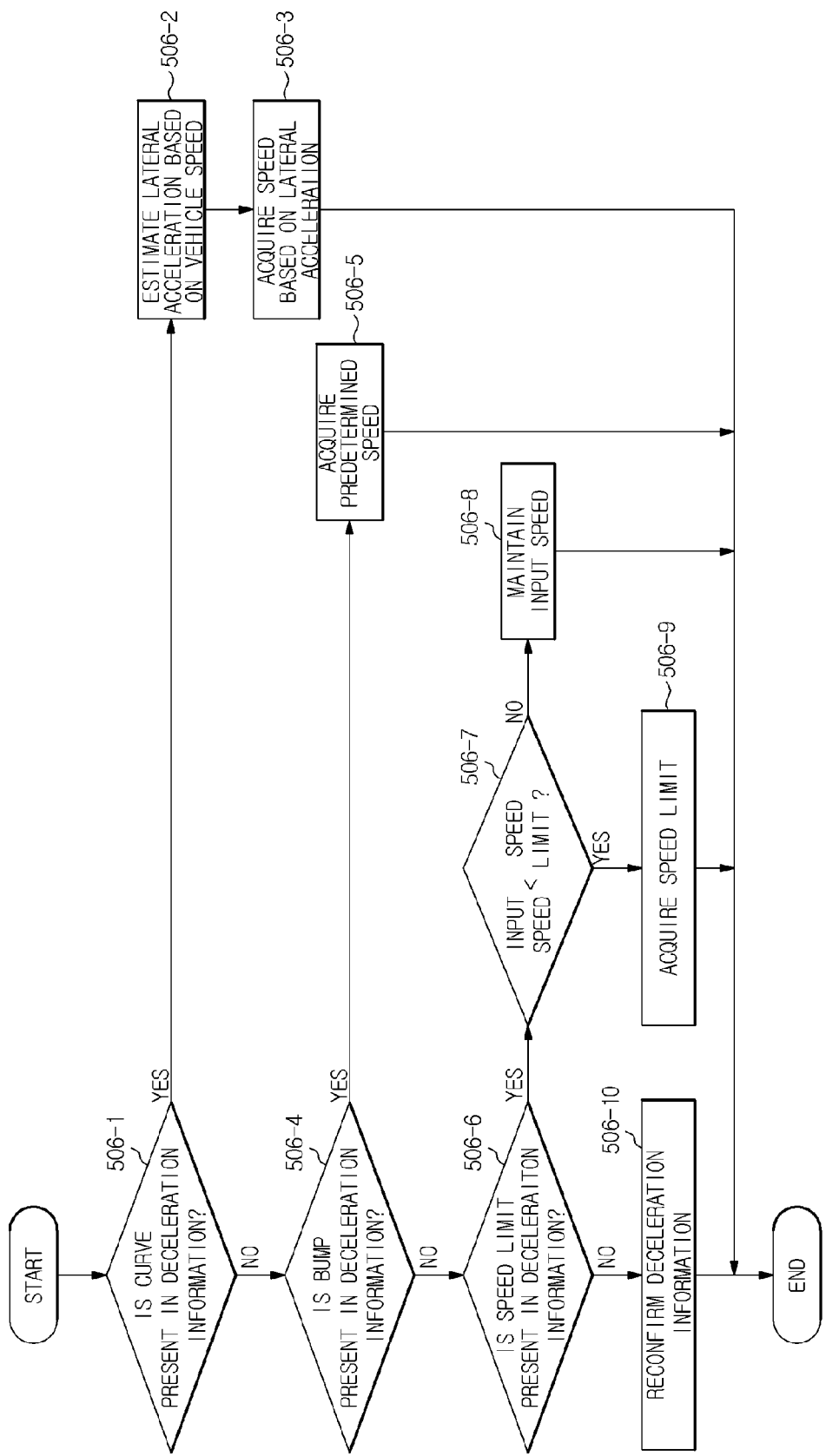

CRUISE CONTROL APPARATUS AND CONTROL METHOD THEREOF

CROSS-REFERENCE TO RELATED APPLICATION

This application claims the benefit of Korean Patent Application No. 2011-0054859, filed on Jun. 8, 2011 in the Korean Intellectual Property Office, the disclosure of which is incorporated herein by reference.

BACKGROUND

1. Field

Embodiments of the present invention relate to a cruise control apparatus to control the traveling speed of a vehicle and a control method thereof.

2. Description of the Related Art

A cruise control apparatus serves to travel a vehicle at a speed that is set by a driver while maintaining a safe distance between the vehicle and an object ahead of the vehicle in a state in which the driver is not stepping on an acceleration pedal.

More specifically, if the driver sets a cruise control mode by operating a corresponding mode setting button, and thereafter sets a vehicle speed, the cruise control apparatus may travel a vehicle at the speed set by the driver while maintaining a safe distance between the vehicle and an object ahead of the vehicle even if the driver does not step on an acceleration pedal.

Such a cruise control mode by the cruise control apparatus may be set based on a driver's will, regardless of peripheral road environments, and maintains a preset traveling speed of the vehicle, which allows the driver to conveniently drive the vehicle at a desired speed even without stepping on an acceleration/deceleration pedal.

However, in fact, different roads have different speed limits.

When a vehicle, a speed of which is preset to 120 km/h based on a cruise control mode, is present on a road having the speed limit of 100 km/h, the driver may not recognize that he/she drives the vehicle at the preset speed of 120 km/h despite the fact that the speed limit of the road is 100 km/h, and thus may unintentionally violate the Road Traffic Act. This may make the driver be fined for violation of the speed limit when photographed by a speed sensing camera.

Moreover, to reduce the vehicle speed at curves or bumps, the driver may be required to inconveniently directly step on a brake or change a vehicle speed.

SUMMARY

Therefore, it is one aspect of the present invention to provide a cruise control apparatus, which may receive road information from a navigation device and reduce a vehicle speed if the received road information contains deceleration information, and a control method thereof.

It is another aspect of the present invention to provide a cruise control apparatus, which may inform a driver of vehicle deceleration information, and a control method thereof.

Additional aspects of the invention will be set forth in part in the description which follows and, in part, will be obvious from the description, or may be learned by practice of the invention.

In accordance with one aspect of the present invention, a cruise control apparatus includes a communication unit to receive road information from a navigation device, and a controller that confirms whether or not deceleration information is present in the road information, confirms a speed corresponding to the deceleration information if the deceleration information is present, and compares the confirmed speed with a current speed, thereby controlling a speed of a vehicle to the confirmed speed if the confirmed speed is greater than the current speed.

The deceleration information may include at least one of a position of a curve, a turning radius of the vehicle at a curve, a position of a bump, and a speed limit.

The cruise control apparatus may further include a wheel speed detecting unit to detect a speed of each of a plurality of wheels provided at the vehicle, and the controller may calculate the vehicle speed based on the speeds of the plurality of wheels if the deceleration information indicates the presence of a curve, and may calculate an allowable vehicle speed based on the vehicle speed and the turning radius of the vehicle at the curve, thereby controlling the speed of the vehicle to the allowable vehicle speed at the position of the curve.

The cruise control apparatus may further include a speed input unit to receive a speed of the vehicle from a driver, and the controller may compare the driver input speed with the allowable vehicle speed, thereby controlling the speed of the vehicle to a lower speed among the two speeds based on a comparison result.

The controller may acquire a predetermined constant speed if the deceleration information indicates the presence of a bump The controller may confirm the highest speed limit if the deceleration information indicates the speed limit, thereby controlling the speed of the vehicle to the highest speed limit.

The cruise control apparatus may further include a speed input unit to receive a speed of the vehicle from a driver, and the controller may compare the driver input speed with the highest speed limit, thereby controlling the vehicle to a lower speed among the two speeds based on a comparison result.

In accordance with another aspect of the present invention, a cruise control method includes traveling a vehicle at a speed input by a driver, receiving road information from a navigation device, confirming whether or not deceleration information is present in the road information, confirming a speed corresponding to the deceleration information if the deceleration information is present, and controlling a speed of the vehicle to the confirmed speed if the confirmed speed is greater than the input speed based on a comparison result of the confirmed speed and the input speed.

The confirming whether or not deceleration information is present may include confirming whether or not at least one of a position of a curve, a turning radius of the vehicle at a curve, a position of a bump, and a speed limit is present.

The controlling the speed of the vehicle may include detecting a speed of each of a plurality of wheels provided at the vehicle if the position of the curve and the turning radius are present in the deceleration information, calculating the vehicle speed based on the speed of the plurality of wheels, calculating a lateral acceleration based on the vehicle speed and the turning radius of the vehicle at the curve, calculating an allowable vehicle speed based on the lateral acceleration, and controlling the speed of the vehicle to the allowable vehicle speed at the position of the curve.

The controlling the speed of the vehicle may include comparing the input speed with the allowable vehicle speed, thereby controlling the speed of the vehicle to a lower speed.

The controlling the speed of the vehicle may include controlling the speed of the vehicle to a predetermined constant speed if the position of the bump is present in the deceleration information.

The controlling the speed of the vehicle may include confirming the highest speed limit if the speed limit is present in the deceleration information, and controlling the speed of the vehicle to the highest speed limit.

The input speed may be compared with the highest speed limit so that the speed of the vehicle is controlled to a lower speed among the two speeds.

BRIEF DESCRIPTION OF THE DRAWINGS

These and/or other aspects of the invention will become apparent and more readily appreciated from the following description of the embodiments, taken in conjunction with the accompanying drawings of which:

FIG. 4 is a flowchart showing detailed operations of the control method of the cruise control apparatus according to the embodiment of the present invention.

DETAILED DESCRIPTION

Figure 1:
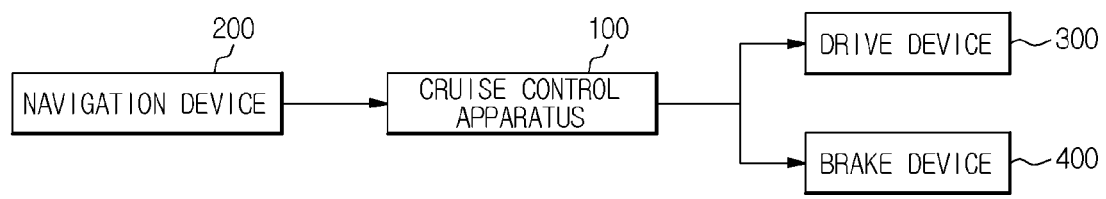
FIG. 1 is a block diagram showing a relationship between a cruise control apparatus and peripheral devices according to an embodiment of the present invention.

Reference will now be made in detail to the embodiment of the present invention, examples of which are illustrated in the accompanying drawings, wherein like reference numerals refer to like elements throughout.

Figure 2:
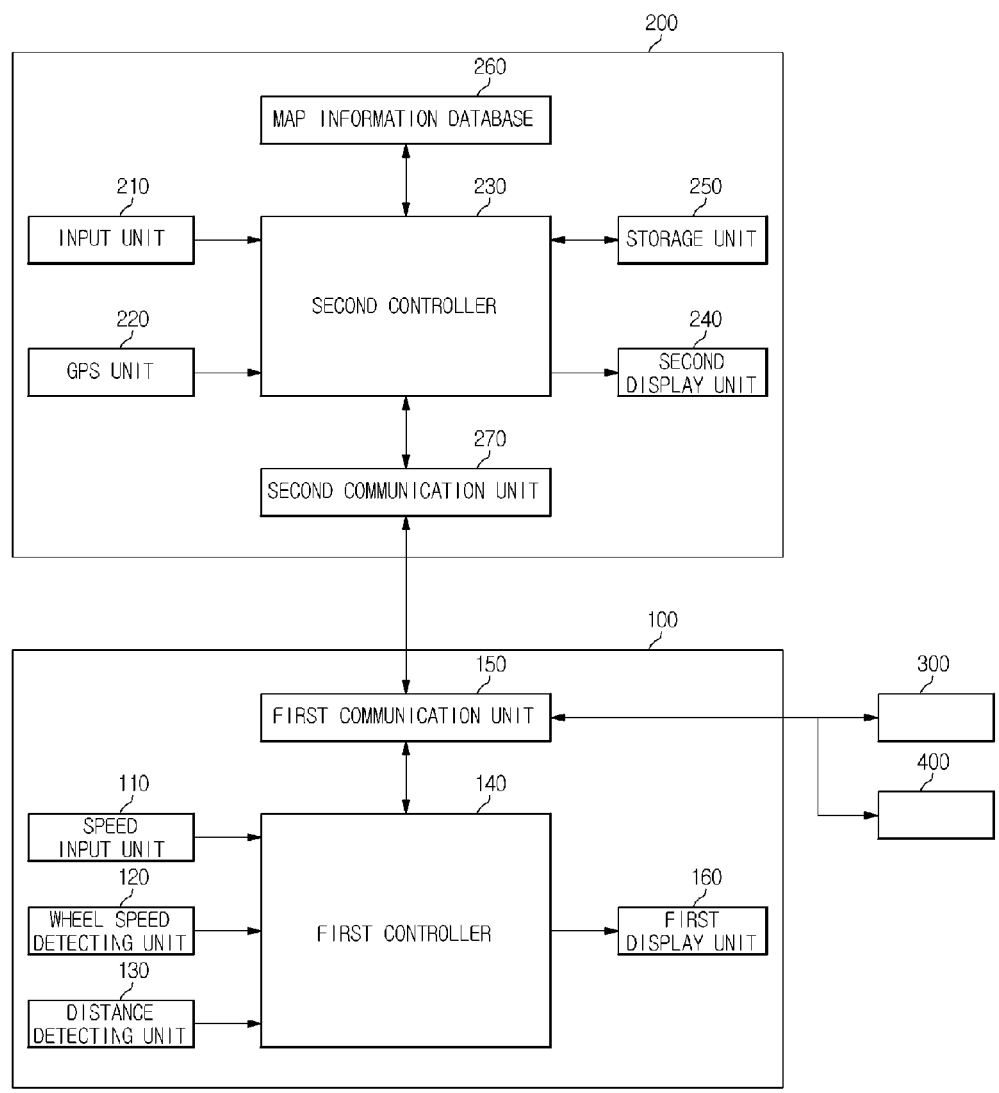
FIG. 2 is a detailed block diagram of the cruise control apparatus according to the embodiment of the present invention.

FIG. 1 is a block diagram showing a relationship between a cruise control apparatus and peripheral devices according to an embodiment of the present invention, and FIG. 2 is a detailed block diagram of the cruise control apparatus according to the embodiment of the present invention.

The cruise control apparatus 100 serves to control a vehicle traveling speed so as to assist a vehicle in traveling at a preset speed or a driver input speed. The cruise control apparatus 100 includes a speed input unit 110, a wheel speed detecting unit 120, a distance detecting unit 130, a first controller 140, a first communication unit 150, and a first display unit 160.

The speed input unit 110 receives a desired vehicle traveling speed input by a driver, and transmits the input vehicle traveling speed to the first controller 140.

The wheel speed detecting unit 120 is provided at each of vehicle wheels (left and right front wheels FL and FR and left and right rear wheels RL and RR) to detect a wheel speed and transmit the detected wheel speed to the first controller 140.

The distance detecting unit 130 detects a distance between a vehicle that is traveling based on a cruise control mode and an object ahead of the vehicle, and transmits the detected distance to the first controller 140.

The distance detecting unit 130 is mounted at a front surface of the vehicle, and serves to detect a position of the object ahead of the vehicle and a distance between the vehicle and the object. To this end, the distance detecting unit 130 may be a radar device that emit electromagnetic waves forward in a vehicle advancing direction within a predetermined angle and receive reflected waves from the object ahead of the vehicle.

The reflected waves contain information required to calculate an angle, relative distance, relative speed, etc. with respect to the object ahead of the vehicle.

The first controller 140 receives the vehicle speed input from the speed input unit 110 and transmits the input speed to a drive device 300. This allows the vehicle to travel at the driver input speed.

In addition, the first controller 140 may directly control the drive device 300 so that the vehicle travels at a speed input via the speed input unit 110.

The first controller 140 controls a vehicle speed based on the distance between the vehicle and the object ahead of the vehicle, transmitted from the distance detecting unit 130.

More specifically, the first controller 140 first calculates a speed difference between the left and right front wheels and the left and right rear wheels based on each wheel speed transmitted from the wheel speed detecting unit 120, and then, calculates a yaw rate of the front wheels and a yaw rate of the rear wheels based on the calculated wheel speed difference and a distance between the left and right wheels. Thereby, the first controller 140 may calculate a slower wheel speed among the speeds of the left and right rear wheels using the yaw rate of the front wheels and the yaw rate of the rear wheels. In this case, the vehicle speed is calculated based on the calculated slower wheel speed.

The first controller 140 also calculates a relative speed and relative distance between the vehicle and the object ahead of the vehicle by analyzing information on the reflected waves transmitted from the distance detecting unit 130 and the vehicle speed via a preset algorithm.

The controller 140 judges whether or not the vehicle is safe based on the relative speed and relative distance. If it is judged that the vehicle is safe, the first controller 140 transmits a speed maintenance signal to the drive device 300. On the other hand, if it is judged that the vehicle is in danger, the first controller 140 transmits a braking signal to a brake device 400, and controls the first display unit 160 to display a warning sign.

The first controller 140 may directly control the drive device 300 and the brake device 400 based on the safety result, so as to control the vehicle speed.

The drive device 300 controls driving of the front and rear and left and right wheels of the vehicle to maintain the traveling speed transmitted from the first controller 140.

If the relative distance between the vehicle and the object ahead of the vehicle is less than a preset safe distance, the brake device 400 is operated in response to a control signal applied from the first controller 140, thereby performing braking to maintain a reference distance and prevent vehicle collision.

More specifically, a brake (not shown) of the brake device 400 is operated to reduce the vehicle speed if the distance between the vehicle and the object ahead of the vehicle is less than a safe distance. In this case, a reduced target speed is the speed transmitted from the first controller 140.

The first controller 140 may request road information from a navigation device 200. If the navigation device 200 transmits road information, the first controller 140 receives the road information and judges whether or not the received road information contains deceleration information.

If the road information does not contain deceleration information, the first controller 140 maintains a current speed. On the other hand, if the road information contains deceleration information, the first controller 140 confirms what kind of deceleration information is contained.

Here, examples of the road information include road names, road positions, lanes, traffic lights, locations where the number of lanes is changed, intersections, positions of tollgates, positions of bumps and curves, speed limits, school-zones, and the like.

Examples of the deceleration information include speed bumps, curves, speed limits, school-zones, and the like.

If the deceleration information indicates the presence of a bump, the first controller 140 first confirms a position of the bump, and transmits a predetermined constant speed to the brake device 400 to allow the vehicle to travel at the predetermined constant speed at the confirmed position. Then, after the vehicle escapes from the position of the bump, the first controller 140 transmits a driver input speed to the drive device 300. In this case, the first controller 140 may judge a time to be consumed to travel at the predetermined constant speed based on a current vehicle speed, current vehicle position, and bump position.

Here, the predetermined speed is about 30 km/h.

If the deceleration information indicates the presence of a curve, the first controller 140 confirms a position of the curve and a turning radius of the vehicle at the curve. Thereby, the first controller 140 may estimate a lateral acceleration of the vehicle based on the turning radius and the vehicle speed, and may calculate an allowable vehicle speed based on the estimated lateral acceleration and a preset allowable lateral acceleration as represented below:

$$\text{Lateral Acceleration} = \frac{\text{Vehicle Speed}^2}{\text{Turning Radius}}$$

$$\text{Vehicle Speed} = \sqrt{\text{Turning Radius} * \text{Lateral Acceleration}}$$

In this case, it may be necessary to control the vehicle speed such that the lateral acceleration does not exceed a preset value (0.3 G), and therefore the allowable vehicle speed is represented as follows:

$$\text{Allowable Vehicle Speed} = \sqrt{\text{TurningRadius} * 0.3G}$$

The first controller 140 compares the driver input speed with the allowable vehicle speed to acquire a smaller one of the two speeds, thereby allowing the vehicle to travel at the acquired speed.

If the deceleration information indicates the speed limit, the first controller 140 confirms the highest speed limit of a current road, and compares the confirmed highest speed limit with the driver input speed. In this case, the first controller 140 controls the vehicle to travel at the driver input speed if the highest speed is greater than the driver input speed, and controls the vehicle to travel at the highest speed if the highest speed is less than the driver input speed. This may prevent speeding.

Here, the speed limit includes the lowest speed and the highest speed.

If the deceleration information indicates the presence of a school-zone, the first controller 140 may control the vehicle to travel at a predetermined speed or less (approximately 30 km/h or less).

The display unit 160 displays that it is necessary to reduce the driver input speed, thereby assisting the driver in recognizing a need for vehicle deceleration. In addition, the display unit 160 may output an alarm sound when deceleration is required.

The navigation device 200 measures a current position of the vehicle using a Global Positioning System (GPS) and displays road information at the current position.

In the case in which the driver inputs a destination, the navigation device 200 also searches for a route from the current position to the destination input by the driver based on a route searching method, and performs guidance to the destination along the searched route.

The navigation device includes an input unit 210, a GPS unit 220, a second controller 230, a second display unit 240, a storage unit 250, a map information database 260, and a second communication unit 270.

The input unit 210 includes a plurality of buttons to issue input of a destination, sound volume and sound on/off, and transmission of road information. The input unit 210 transmits information on the button selected by the driver to the second controller 230.

For example, if the driver inputs destination information via the input unit 210, the input unit 210 transmits the input destination information to the second controller 230. Also, if the driver pushes a button to issue transmission of road information, the input unit 210 transmits an input signal to the second controller 230.

The GPS unit 220 receives position signals from a plurality of GPS satellites to thereby calculate a position of the GPS unit 220 and transmit the calculated position of the GPS unit 220 (i.e. a position of the vehicle) to the second controller 230. The GPS unit 220 includes a GPS antenna to receive satellite signals from the plurality of GPS satellites, an acceleration sensor (not shown) to measure an acceleration of the vehicle, and a direction sensor (not shown) to sense a direction of the vehicle. The GPS unit 220 transmits the current position of the vehicle, acceleration data, and direction data to the second controller 230.

If destination information is transmitted from the input unit 210, the second controller 230 searches for a route from the current position to the destination, and performs map matching of the searched route, thereby guiding the vehicle from the current position to the destination while displaying map matching data.

If transmission of road information is issued via the input unit 210, the second controller 230 transmits information on a road where the vehicle is located at present to the cruise control apparatus 100.

Here, examples of the road information include road names, road positions, lanes, traffic lights, locations where the number of lanes is changed, intersections, positions of tollgates, positions of bumps and curves, speed limits, school-zones, and the like.

The second display unit 240 displays a map to which the current position of the vehicle is matched, operational conditions, and other information based on instructions of the second controller 230.

The second display unit 240 may be a Liquid Crystal Display (LCD) or a touch-screen. In case of the touch-screen, the second display unit 240 may display a plurality of buttons to control operation of the navigation device 200. In this case, when any one of the displayed buttons or any road on the map is touched, the second display unit 240 transmits a position value of the touched point to the second controller 230.

The storage unit 250 may store a control program to control operation of the navigation device 200, and stores information on the searched routes.

The storage unit 250 also stores the identification number of the cruise control apparatus 100 to which the road information will be transmitted.

The map information database 260 stores map data containing matched topographies based on latitude and longitude, geographical roads, road names, positional information, lane information, and speed limits, positions of traffic lights, positions of bumps, speed limits, positions of curves, school-zones, and road switching locations.

The road switching locations mean locations where the number of lanes of roads changes, intersections, and the like.

The second communication unit 270 performs wireless/wired communication with the cruise control apparatus 100, and transmits road information to the cruise control apparatus 100 based on a command of the second controller 230.

The navigation device 200 may be replaced by a terminal that provides road information, such as a smart-phone.

Figure 3:
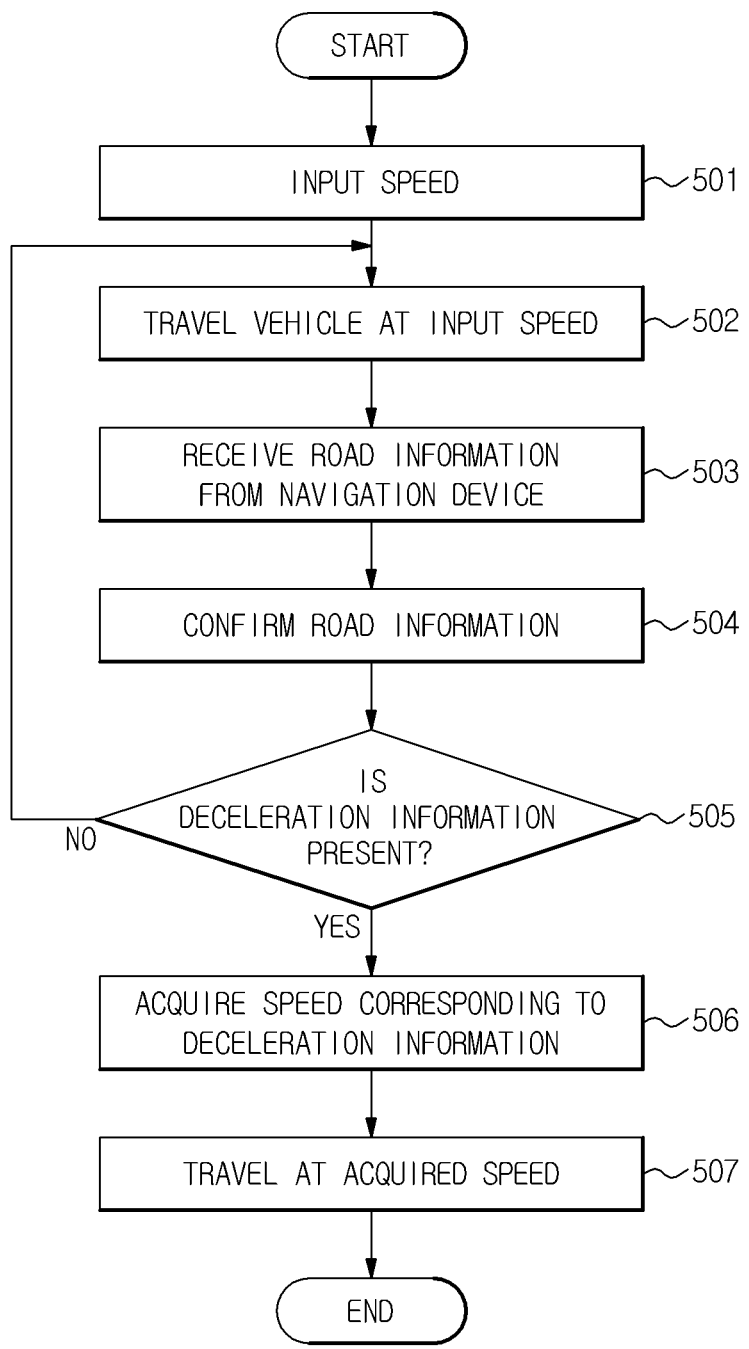
FIG. 3 is a flowchart showing a control method of the cruise control apparatus according to the embodiment of the present invention.

FIGS. 3 and 4 are flowcharts showing a control method of the cruise control apparatus according to the embodiment of the present invention.

First, if the driver selects a cruise control mode and a desired vehicle traveling speed is input via the input unit 110 (501), the cruise control apparatus 100 sets the input speed to a vehicle speed.

Then, the cruise control apparatus 100 controls a vehicle to travel at the input speed (502).

In this case, the distance detecting unit 130 of the cruise control apparatus 100 detects a position of an object ahead of the vehicle and measures a distance between the vehicle and the object. Thereby, the cruise control apparatus 100 controls the vehicle speed based on the measured result.

That is, if the distance between the vehicle and the object ahead of the vehicle is greater than a safe distance, the vehicle speed is maintained at the input speed. Also, if the distance between the vehicle and the object ahead of the vehicle is less than the safe distance, braking control is performed such that the vehicle travels at a reduced speed.

In this way, it may be possible to prevent vehicle collision and to improve stability and reliability in traveling.

Next, the cruise control apparatus 100 performs communication with the navigation device 200, and receives information on a road where the vehicle is located at present from the navigation device 200.

That is, if information on the current road is transmitted from the navigation device 200 (503), the cruise control apparatus 100 confirms the transmitted road information (504), thereby judging whether or not the road information contains deceleration information (505).

In this case, if the road information does not contain deceleration information, the cruise control apparatus 100 controls the vehicle to travel at the speed input by the driver. On the other hand, if the road information contains deceleration information, the cruise control apparatus 100 acquires a speed corresponding to the deceleration information (506).

Next, the cruise control apparatus 100 controls operation of the drive device 300 and the brake device 400 such that the vehicle travels at the acquired speed (507).

Next, deceleration control will be described in more detail with reference to FIG. 4.

The cruise control apparatus 100 judges whether the deceleration information indicates that a curve is present ahead (506-1). In this case, if the deceleration information indicates the presence of a curve, the cruise control apparatus 100 confirms a position of the curve and a turning radius of the vehicle at the curve.

Next, the cruise control apparatus calculates a speed difference between the left and right front wheels and the left and right rear wheels based on each wheel speed transmitted from the wheel speed detecting unit 120, and then calculates a yaw rate of the front wheels and a yaw rate of the rear wheels based on the calculated wheel speed difference and a distance between the left and right wheels, and also calculates a slower wheel speed among the speeds of the left and right rear wheels using the yaw rate of the front wheels and the yaw rate of the rear wheels. In this case, the vehicle speed is calculated based on the calculated slower wheel speed.

Next, the cruise control apparatus 100 estimates a lateral acceleration of the vehicle based on the turning radius and the vehicle speed (506-2), and calculates an allowable vehicle speed based on the estimated lateral acceleration and a preset allowable lateral acceleration.

Since it may be necessary to control the vehicle speed such that the lateral acceleration does not exceed a preset value (0.3 G), the allowable vehicle speed is represented as follows:

$$\text{Lateral Acceleration} = \frac{\text{Vehicle Speed}^2}{\text{Turning Radius}}$$

$$\text{Allowable Vehicle Speed} = \sqrt{\text{Turning Radius} * 0.3 \text{ G}}$$

Next, the cruise control apparatus 100 compares the driver input speed with the allowable vehicle speed to acquire a smaller one of the two speeds (506-3), thereby allowing the vehicle to travel at the acquired speed.

The cruise control apparatus 100 judges whether the deceleration information indicates the presence of a bump (506-4). If it is judged that the deceleration information indicates the presence of a bump, the cruise control apparatus 100 acquires a predetermined constant speed (506-5).

Next, the cruise control apparatus 100 confirms a position of the bump, and controls the vehicle to travel at the predetermined speed while passing the bump. In this case, it may be possible to judge a time to be consumed to travel at the predetermined speed based on a current vehicle speed, current vehicle position, and bump position. Here, the predetermined speed is about 30 km/h.

Next, the cruise control apparatus 100 controls the vehicle to travel at the driver input speed after the vehicle escapes from the position of the bump.

The cruise control apparatus 100 judges whether the deceleration information indicates the speed limit (506-6). If it is judged that the deceleration information indicates the speed limit, the cruise control apparatus 100 confirms the highest speed limit of a current road, and compares the confirmed highest speed limit with the driver input speed (506-7).

Next, the cruise control apparatus 100 controls the vehicle to maintain the driver input speed if the highest speed is greater than the driver input speed (506-8), and acquires the highest speed if the highest speed is less than the driver input speed (506-9), thereby controlling the vehicle to travel at the acquired highest speed. This may prevent speeding.

Here, the speed limit includes the highest speed and the lowest speed.

Next, the cruise control apparatus 100 reconfirms the presence of deceleration information if the road information does not contain all of the curve, the bump, and the speed limit (506-10).

If the vehicle speed exceeds the speed limit of a road, the vehicle speed is automatically reduced to below the speed limit, and a warning operation is performed. Thereby, probability of accidents due to speeding may be reduced, and it may be possible to make the driver obey the Road Traffic Act and to prevent imposition of fines due to speeding.

Further, the vehicle speed is automatically reduced at bumps or curves, which may result in enhanced safety and driver convenience.

The configuration of the cruise control apparatus to control a vehicle speed based on road information from the navigation device may be applied to an adaptive cruise control apparatus and a smart cruise control apparatus.

Although the embodiment of the present invention has been shown and described, it would be appreciated by those skilled in the art that changes may be made in the embodiment without departing from the principles and spirit of the invention, the scope of which is defined in the claims and their equivalents.

FIG. 1

100: CRUISE CONTROL APPARATUS
200: NAVIGATION DEVICE
300: DRIVE DEVICE
400: BRAKE DEVICE

FIG. 2

110: SPEED INPUT UNIT
120: WHEEL SPEED DETECTING UNIT
130: DISTANCE DETECTING UNIT
140: FIRST CONTROLLER
150: FIRST COMMUNICATION UNIT
160: FIRST DISPLAY UNIT
210: INPUT UNIT
220: GPS UNIT
230: SECOND CONTROLLER
240: SECOND DISPLAY UNIT
250: STORAGE UNIT
260: MAP INFORMATION DATABASE
270: SECOND COMMUNICATION UNIT

FIG. 3

START
501: INPUT SPEED
502: TRAVEL VEHICLE AT INPUT SPEED
503: RECEIVE ROAD INFORMATION FROM NAVIGATION DEVICE
504: CONFIRM ROAD INFORMATION
505: IS DECELERATION INFORMATION PRESENT?
506: ACQUIRE SPEED CORRESPONDING TO DECELERATION INFORMATION
507: TRAVEL AT ACQUIRED SPEED
END

FIG. 4

START
506-1: IS CURVE PRESENT IN DECELERATION INFORMATION?
506-2: ESTIMATE LATERAL ACCELERATION BASED ON VEHICLE SPEED
506-3: ACQUIRE SPEED BASED ON LATERAL ACCELERATION
506-4: IS BUMP PRESENT IN DECELERATION INFORMATION?
506-5: ACQUIRE PREDETERMINED SPEED
506-6: IS SPEED LIMIT PRESENT IN DECELERATION INFORMATION?
506-7: INPUT SPEED<SPEED LIMIT?
506-8: MAINTAIN INPUT SPEED
506-9: ACQUIRE SPEED LIMIT
506-10: RECONFIRM DECELERATION INFORMATION
END

What is claimed is:

1. A cruise control apparatus, comprising:
a communication unit to receive road information from a navigation device; and
a controller that confirms whether or not deceleration information is present in the road information, confirms a speed corresponding to the deceleration information if the deceleration information is present, compares the confirmed speed with a current speed, and controls a speed of a vehicle to the confirmed speed if the confirmed speed is greater than the current speed; and
a speed input unit to receive a speed of the vehicle from a driver,
wherein the deceleration information present in the road information received from the navigation device includes at least one of a position of a curve, a turning radius of the vehicle at a curve, and a speed limit,
wherein the deceleration information indicates the position of a bump, and the controller controls the speed of the vehicle based on the information on the position of the bump to set the speed of the vehicle to a predetermined constant speed while passing the position of the bump,
wherein the controller confirms the highest speed limit if the deceleration information indicates the speed limit, and controls the speed of the vehicle to the highest speed limit, and
wherein when the speed of the vehicle from the driver is received, the controller compares the driver input speed with the highest speed limit, and controls the vehicle to a lower speed among the driver input speed and the highest speed limit based on a comparison result.

2. The cruise control apparatus according to claim 1, further comprising a wheel speed detecting unit to detect a speed of each of a plurality of wheels provided at the vehicle,
wherein the controller calculates the vehicle speed based on the speeds of the plurality of wheels if the deceleration information indicates the presence of a curve, calculates an allowable vehicle speed based on the vehicle speed and the turning radius of the vehicle at the curve, and controls the speed of the vehicle to the allowable vehicle speed at the position of the curve.

3. The cruise control apparatus according to claim 2,
wherein the controller compares the driver input speed with the allowable vehicle speed, and controls the speed of the vehicle to a lower speed among the driver input speed and the allowable vehicle speed based on a comparison result.

4. A cruise control method, comprising:
traveling a vehicle at a speed input by a driver;
receiving road information from a navigation device;
confirming whether or not deceleration information is present in the road information;
confirming a speed corresponding to the deceleration information if the deceleration information is present; and
controlling a speed of the vehicle to the confirmed speed if the confirmed speed is greater than the input speed based on a comparison result of the confirmed speed and the input speed,
wherein the deceleration information present in the road information received from the navigation device includes a position of a bump, and
wherein the controlling the speed of the vehicle includes:
detecting a speed of each of a plurality of wheels provided at the vehicle if the position of the curve and the turning radius are present in the deceleration information;

calculating the vehicle speed based on the speed of the plurality of wheels;

calculating a lateral acceleration based on the vehicle speed and the turning radius of the vehicle at the curve;

calculating an allowable vehicle speed based on the lateral acceleration;

controlling the speed of the vehicle to the allowable vehicle speed at the position of the curve;

comparing the input speed with the allowable vehicle speed; and controlling the speed of the vehicle to a lower speed among the input speed and the allowable vehicle speed when the speed of the vehicle from the driver is received.

5. The cruise control method according to claim 4, wherein the confirming whether or not deceleration information is present includes confirming whether or not at least one of a position of a curve, a turning radius of the vehicle at a curve, and a speed limit is present in the road information.

6. The cruise control method according to claim 5, wherein the controlling the speed of the vehicle includes controlling the speed of the vehicle based on the information on the position of the bump to set the speed of the vehicle to a predetermined constant speed if the position of the bump is present in the deceleration information.

7. The cruise control method according to claim 5, wherein the controlling the speed of the vehicle includes:

confirming the highest speed limit if the speed limit is present in the deceleration information; and controlling the speed of the vehicle to the highest speed limit.

8. The cruise control method according to claim 7, wherein the input speed is compared with the highest speed limit so that the speed of the vehicle is controlled to a lower speed among the input speed and the highest speed limit.

9. The cruise control apparatus according to claim 1, wherein the controller further controls the speed of the vehicle to the confirmed speed after the vehicle has passed the position of the bump.

10. The cruise control apparatus according to claim 2, wherein the controller calculates the current speed of the vehicle based on a slower wheel speed among the speeds of each of the plurality of wheels.

11. The cruise control apparatus according to claim 2, wherein the controller further calculates a yaw rate of front wheels of the vehicle and a yaw rate of rear wheels of the vehicle based on the speeds of each of the plurality of wheels of the vehicle and on a distance between left and right wheels of the vehicle.

12. The cruise control method according to claim 4, wherein the controlling the speed of the vehicle comprises controlling the speed of the vehicle to the confirmed speed after the vehicle has passed the position of the bump.

13. The cruise control method according to claim 4, wherein the calculating the vehicle speed comprises calculated the vehicle speed based on a slower wheel speed among the speeds of each of the plurality of wheels.

14. The cruise control method according to claim 4, further comprising calculating a yaw rate of front wheels of the vehicle and a yaw rate of rear wheels of the vehicle based on the speeds of each of the plurality of wheels of the vehicle and on a distance between left and right wheels of the vehicle.

* * * * *